United States Patent
Clark

Patent Number: 4,598,848
Date of Patent: Jul. 8, 1986

[54] SPARE TIRE CARRIER

[76] Inventor: G. Keith Clark, Kannah Creek, Whitewater, Colo. 81527

[21] Appl. No.: 807,129

[22] Filed: Dec. 11, 1985

Related U.S. Application Data

[63] Continuation of Ser. No. 638,932, Aug. 9, 1984, abandoned.

[51] Int. Cl.$^4$ .................................................. B60R 9/02
[52] U.S. Cl. ................................ 224/42.24; 224/42.12; 224/42.21
[58] Field of Search .............. 224/42.12, 42.42, 42.24, 224/42.21, 42.26; 414/463; 296/37.2; 403/43

[56] References Cited

U.S. PATENT DOCUMENTS

| | | | |
|---|---|---|---|
| 3,204,840 | 9/1965 | Bowen . | |
| 3,389,924 | 6/1968 | Bush et al. .................. | 403/43 X |
| 3,613,972 | 10/1971 | Daughhetee .................. | 224/42.24 |
| 3,715,066 | 2/1973 | Owen . | |
| 3,923,220 | 12/1975 | Marcyan .................... | 403/43 X |
| 3,940,178 | 2/1976 | Leveque .................... | 224/42.25 X |
| 4,007,863 | 2/1977 | Norris ...................... | 224/42.24 |
| 4,013,203 | 3/1977 | McCauley . | |
| 4,068,856 | 1/1978 | Harris ...................... | 224/42.24 X |
| 4,089,449 | 5/1978 | Bayne et al. . | |
| 4,111,344 | 9/1978 | MacDonald .................. | 224/42.24 |
| 4,130,227 | 12/1978 | Rice ........................ | 224/42.24 |
| 4,225,066 | 9/1980 | Barr ......................... | 224/42.24 |
| 4,366,923 | 1/1983 | Koch ........................ | 224/42.24 |
| 4,387,837 | 6/1983 | Carr et al. .................. | 224/42.24 X |
| 4,416,402 | 11/1983 | Matthew .................... | 224/42.24 |

*Primary Examiner*—Stephen Marcus
*Assistant Examiner*—Robert Petrik
*Attorney, Agent, or Firm*—Dowell & Dowell

[57] ABSTRACT

A removably mounted spare tire carrier for use in mounting a spare tire to a side wall of the load bed of a pickup truck which carrier is engaged in a mounted position by manual adjustment of a vertical mounting bar assembly having portions which both engage the beaded edge or rail of the truck body and the floor of the truck bed and which assembly is prevented from further adjustment after the spare tire is mounted thereto by a tire mounting assembly which extends therefrom through the wheel hub of the tire and which tire mounting assembly is manually tightened to secure the tire to the truck bed.

12 Claims, 4 Drawing Figures

SPARE TIRE CARRIER

This application is a continuation of application Ser. No. 638,932, filed 8/09/84, now abandoned.

BACKGROUND OF THE INVENTION

1. Field of the Invention

This invention is generally related to spare tire mounting brackets or assemblies for use in mounting a spare tire to a vehicle and particularly to a removably mounted spare tire carrier having a first portion which is selectively and movably adjusted into a mounted position adjacent a side wall of a pickup truck load bed and a secured portion which is manually operable to engage the spare tire and retain the tire in fixed relationship with the first portion of the carrier.

2. History of the Art

Spare tire storage and/or mounting problems are as old as the automobile industry itself. There have been numerous devices developed over the years for not only mounting spare tires to vehicles but also for locking or otherwise preventing the unauthorized removal of such tires from the vehicles. In addition, each style of vehicle presents a different or unique problem relative to spare tire storage or mounting.

The present invention is particularly adapted for use with pickup trucks which have a front cab and a rear load carrying bed which is defined by opposing side walls or panels.* There are currently many styles and types of spare tire carriers which are designed for use with pickup trucks. Some of these carriers are mounted under the vehicle load bed and are only accessible by dropping, extending, pivoting or otherwise manipulating the carrier so that the spare tire may be handled without having to be under the vehicle. Such mounting devices are limited in their desirability not only due to their complicated structure but also because such devices expose the tire to damage from tar, mud, rocks and accidental impact from other objects overwhich the truck may pass. In order to protect such tires from adverse elements and conditions, complete housings or enclosures have been designed, however, enclosing the tire adds significantly to the cost and complexity of the carrier.

Other tire carriers specifically designed for pickup trucks have included side cab and outside panel mounting devices. These types of carriers are prominently displayed are not aesthetically as pleasing to the public. Additionally, these carriers must generally be permanently secured to the vehicle body thereby making installation difficult.

A preferred type of spare tire carrier for pickup trucks are the type which are installed or used within the load bed of the truck. Generally, these types of carriers fall into two groups. The first group are permanently mounted to the truck bed or side wall by bolts or welding. These carriers therefore require modification to the vehicle such as by drilling holes in the bed and also often interfere with the load space of the truck bed. Examples of this type of tire carrier include U.S. Pat. Nos. 3,715,066 to Owen; 4,013,203 to McCauley; and 4,089,449 to Bayne.

The second group of load bed spare tire carriers are removably secured to a side wall of the vehicle. This type of carrier offers the advantage of being removable from the truck bed when additional hauling space is required and also may be installed without damaging or changing the integrity of the vehicle body. Many of these removably mounted carriers include complex structures, however, and other structures may require tools to be used to insure that they are securely installed. Some of the more simple designs discuss being adapted for manual installation, however, such carriers are not normally as securely retained in place and may be released by some unauthorized person tampering with the carrier assembly. Some if these carriers are not vertically adjustable and therefore will only fit a specific vehicle body while others permit limited vertical adjustment which may result in a loose fit between the carrier and the vehicle body. Other carriers rely upon the inflated spare tire to prevent removal of the tire itself from the carrier. Unfortunately, deflation of the tire makes the tire flexible enough to permit its removal from the carrier.

Some examples of the second type of spare tire carriers for pickup trucks include U.S. Pat. Nos. 3,204,840 to Bowen; 4,007,863 to Norris, 4,130,227 to Rice; 4,366,923 to Koch; 4,387,837 to Carr et al.; and 4,416,402 to Matthew.

SUMMARY OF THE INVENTION

This invention is directed to a removable spare tire carrier and locking system for pickup trucks and includes a vehicle body engaging assembly having an extendable upper portion which adjustably engages the lip or side rail of the side wall and which is vertically adjusted by means of an elongated sleeve portion into which the upper portion is threadingly engaged. The lower portion of the side wall engaging assembly includes a rod member which is angled away from the vertical orientation of the remainder of the assembly so as to be directed toward the side wall of the truck. An elongated stabilizer bar is secured at the outermost portion of the rod member and extends perpendicularly thereto. A J-hook is received about the central sleeve portion of the assembly and extends outwardly therefrom so as to pass through the open hub of the spare tire. A plate is clampingly engaged against the spare tire by a manually operated lock nut which is mounted on the J-bolt and a lock is provided to secure the lock nut to the plate to prevent its unauthorized removal. Tightening of the plate against the tire simultaneously binds the J-bolt against the sleeve of the vehicle body engaging assembly and thereby prevents its further manipulation.

It is the primary object of this invention to provide a spare tire carrier for use with pickup trucks which is not permanently mounted to the body of the vehicle and which requires no modification to the body panels or frames to permit installation and which is installed manually without the need for tools It is another object of the present invention to provide a spare tire carrier for pickup trucks which cannot be removed by pivoting the mounting assembly about the upper portion thereof and which cannot be displaced by an unauthorized person by deflation of the spare tire.

It is yet another object of the present invention to provide a spare tire carrier which includes a manually adjustable vehicle engaging support structure having an elongated adjusting sleeve which is retained in adjusted position by a J-bolt assembly which surrounds the sleeve and to which the spare tire is clampingly engaged and locked.

It is a further object of the present invention to provide a vehicle spare tire carrier which is inexpensive and simple in design and yet which provides a secure mounting device which prevents unauthorized removal of the spare tire but which can be completely installed or removed by hand and can be stored out of sight when not in use.

DESCRIPTION OF THE PREFERRED EMBODIMENT

Figure 1:
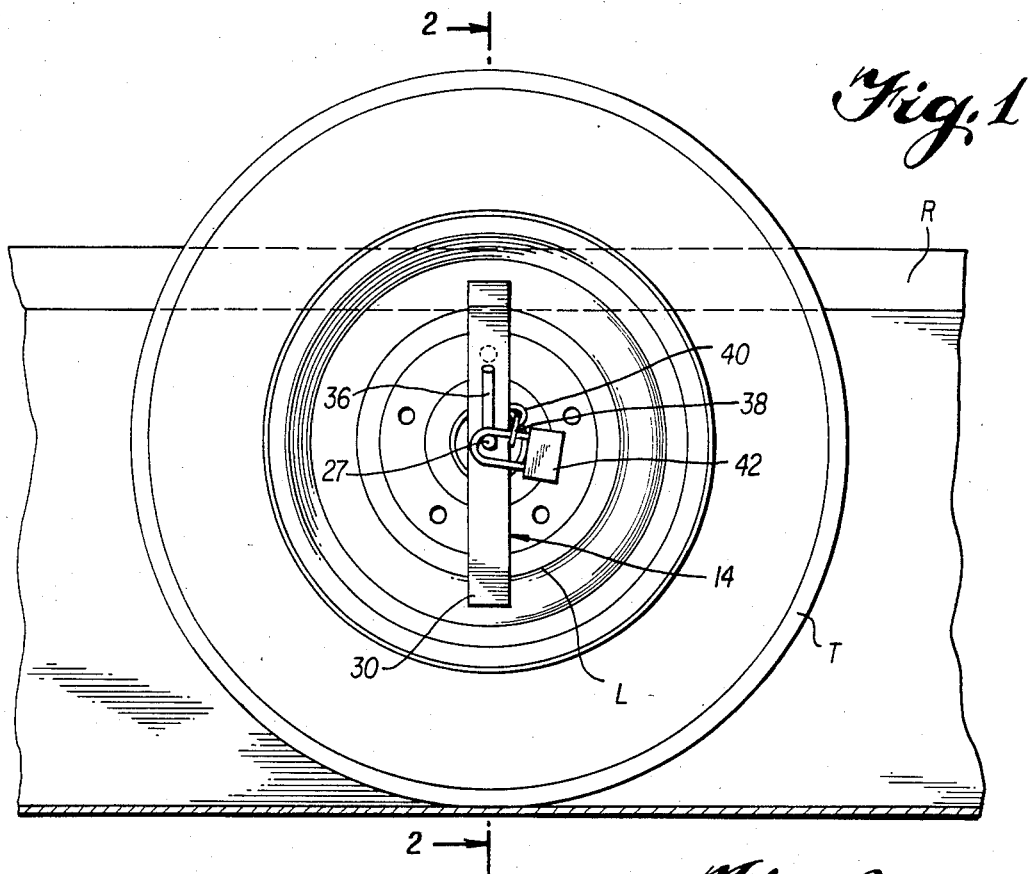
FIG. 1 is an illustrational view of the tire carrier of the present invention as it is used to mount a spare tire to the side wall of a pick-up truck.
Figure 2:
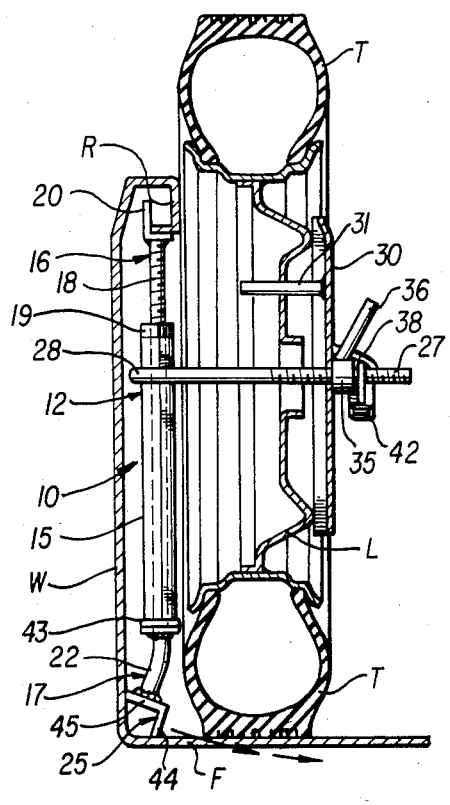
FIG. 2 is a cross-sectional view taken along lines 2—2 of FIG. 1 showing the vertical oriented mounting body engaging assembly and tire clamping assembly.
Figure 3:
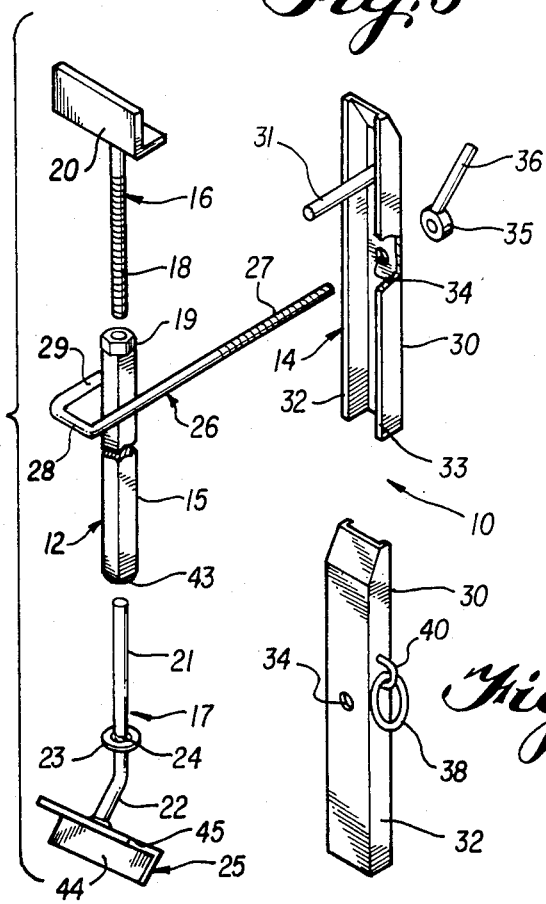
FIG. 3 is an assembly view showing the various components of the tire carrier of the present invention.
Figure 4:
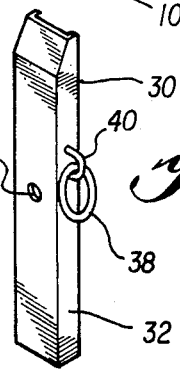
FIG. 4 is a front elevational view of the locking plate shown in rear elevation in FIG. 3.

With continued reference to the drawings, the tire carrier 10 of the present invention is shown in FIGS. 1 and 2 as it is placed in a mounted position to secure a spare tire T relative to the side wall W and floor F of a pick-up truck load bed. As shown, the side wall W of the load bed includes an upper lip or rail portion R which extends along the length of the load bed and on each side thereof.

The tire carrier includes a vertically adjustable vehicle body engaging assembly 12 and a tire clamping and locking assembly 14. The vehicle body engaging assembly includes a generally square tubular central hollow elongated sleeve portion 15, upper rail engaging clamp 16 and lower floor engaging clamp 17. The sleeve is preferably constructed of a square tubing so that the outside walls are generally flat for purposes that will be described hereinafter. The upper rail engaging clamp includes a threaded rod portion 18 which is threadingly and adjustably receivable through a nut 19 which is welded to the upper portion or end of the central sleeve 15. Due to the mounting of the rod portion 18 through the nut 19, as the sleeve is rotated, the rod portion will be selectively received within the sleeve or extended therefrom depending upon whether or not the rail engaging clamp is being lowered from engagement with the body side rail or raised toward engagement therewith.

In order to provide a stable engagement between the tire carrier and the side rail, an elongated L-shaped channel iron member 20 is welded to the upper end of the threaded rod portion 18 of the rail clamping member. The channel member 20 will assist in preventing rocking of the carrier when it is mounted to the vehicle and will distribute the forces locking the carrier in place along an extended portion of the side rail.

The lower floor engaging clamp 17 of the vehicle body engaging assembly includes an elongated rod element 21 having the lower portion thereof 22 angled outwardly with respect to the upper portion. The angle of inclination relative to the vertical is approximately at least 20°. An abutment flage 23 is positioned along the rod element adjacent but spaced above the lower portion thereof. The flange may be retained in position by welding metal beads 24 above and below the element so that the element, which may be formed by an annular washer, is freely rotatable about the rod element. The flange 23 will act as a seat for supporting the lower end of the tabular sleeve 15 which lower end has another washer element 43 welded thereto.

The lower end 22 of the rod element 21 is angled outwardly toward the side wall of the truck, as shown in FIG. 2., and an elongated base portion 25 is welded thereto and extends generally perpendicularly thereof. The base 25 is formed of channel iron having two elongated stabilizing leg portions 44 and 45. The upper leg portion 43 will engage the side wall of the truck and the lower leg portion 44 will engage the floor of the truck bed. In this manner, the mounting forces directed downwardly along the rod element 21 will be distributed outwardly to the floor and wall of the truck body.

With particular reference to FIG. 2, the shaped rod element 21 prevents the vehicle body engaging assembly from being swingably removed or pulled from a mounted engagement between the body side rail and floor as the point of contact of the stabilizing base 25 with the truck floor and the point of contact of the channel member 20 are not vertically aligned. As the point of contact of the base is closer to the side wall than the point of contact of the upper clamping channel member, it would be necessary for the base to actually move through an arc in order to pivot the assembly about the point of contact between the channel member 20 and the side rail to remove the assembly from engagement with the truck. Further, as the base is contacting the floor of the truck bed, the assembly is prevented by the floor from moving through the arcuate path (shown by the arrows in FIG. 2).

To install the vehicle body engaging assembly to the truck, the assembly, with the upper clamping portion threaded into the sleeve, is positioned under the body side rail with the bar 25 engaging the floor as shown in FIG. 2. The square sleeve is rotated by hand extending the threaded rod 18 upwardly so that the channel member 20 tightly engages the side rail. As the lower rod 21 forming a portion of the lower clamping member is freely supported within the sleeve 15, the sleeve will simply rotate with respect thereto.

In order to secure a spare tire T to the vehicle body engaging assembly, the tire mounting assembly 14 is provided with an elongated J-bolt 26 which is threaded along its extended portion 27. The head 28 of the J-bolt is open so that the end portion 29 of the head extends generally parallel to the extended position. In order to provide for a more cooperative engagement between the head of the J-bolt and the square sleeve, the head of the J-bolt could be bent or formed into an open square configuration. In this manner, the shaped head of the J-bolt will cooperatively abut the sides of the square tubing forming the sleeve 15. In either case, the dimension between the axis of the end portion 29 and the axis of the extended portion 28 of the J-bolt are only slightly greater than the width dimension between the parallel side walls of the sleeve 15 so that the head will closely engage the sleeve.

The spare tire is clamped in mounted engagement over the extended portion of the J-bolt by a tire clamping plate 30. The clamping plate 30 has a pin 31 extending therefrom which pin is selectively receivable through one of the stud holes H in the wheel L of the spare tire. The pin 31 prevents the clamping plate 30 from being rotated relative to the tire during use. The clamping plate is shown as being contructed of an elongated channel member which is of a length to extend substantially across the wheel so that the plate will be properly seated against the wheel when in use. In addition, the plate 30 has a generally U-shaped cross section having generally parallel side walls 32 and 33. A central opening 34 is provided through the plate for receiving the extended end portion of the J-bolt.

The clamping plate 30 is forced into and retained in engagement with the wheel of the spare tire by a locking nut 35 which is threadingly received along the end 27 of the J-bolt. The locknut is provided with an outwardly extending handle 36 by way of which a person may obtain substantial leverage for tightly securing the locknut against the clamping plate and spare tire. As the locknut is tightened, not only will the clamping plate be urged against the side rail R of the truck bed but the head of the J-bolt will be drawn into a compressive engagement with the sleeve 15. The engagement between the head of the J-bolt and the sleeve will prevent any relative rotation of the sleeve and thus the vehicle body engaging assembly 12 cannot be removed from its mounted position until the locknut 35 is rotated to release pressure from the clamping plate 30.

To prevent unauthorized removal or tampering of the locknut 35, a short length of heavy duty chain 38 is fixedly secured to the side wall 32 of the clamping plate 30 by a U-shaped retaining member 40 which is welded thereto. The length of chain 38 need only be long enough to extend a short distance along the extended end portion 27 of the J-bolt. A conventional padlock 42 may then be placed over the extended end 27 of the J-bolt and through a length of the chain 38 to thereby prevent the locknut from being removed from the J-bolt. As an alternative, the padlock may be used to join the handle 36 of the locknut to the chain and thereby prevent rotation of the locknut.

In use, the spare tire carrier of the present invention may be manually installed to the bed of a conventional pickup truck. The vehicle body engaging assembly is first positioned along a side wall of the bed of the truck with the base 25 thereof in engagement with the wall and floor of the truck bed. The rotatable sleeve 15 is subsequently manually rotated thereby urging the upper clamping channel member 20 into engagement with the side rail of the truck. The head 28 of the J-bolt 26 is placed around the sleeve 15 and the spare tire positioned over the extended end portion 28 of the J-bolt. Next the clamping plate 30 is placed over the threaded end portion of the J-bolt with the pin 31 positioned through a locknut hole in the spare tire wheel. The locknut 35 is manually tightened using the handle 36 thereby forcing the clamping plate 30 to urge the tire against the side rail of the truck which also binds the head 28 of the J-bolt 26 against the sleeve 15. The padlock 42 is subsequently used to lock the chain 30 to either the handle 36 of the locknut or the threaded end portion 27 of the J-bolt.

I claim:

1. A spare tire carrier apparatus for pickup trucks wherein the trucks have a load bed floor and side walls with an upper rail, in which the spare tire carrier comprises a vehicle body engaging assembly and a spare tire clamping assembly, said vehicle body engaging assembly having upper and lower end portions and a generally hollow elongated central sleeve means having upper and lower portions, said elongated sleeve means having vertically extending generally planar side walls, said vehicle body engaging assembly being vertically adjustable by manual rotation of said elongated central sleeve means to cause at least one of said upper and lower end portions to be outwardly extended with respect to said elongated central sleeve means so that said upper end portion will engage the upper rail of the side wall of the pickup truck and said lower end portion will engage the load bed floor of the truck, said lower end portion of said vehicle body engaging assembly extending outwardly with respect to the axis of said generally hollow elongated central sleeve means, said spare tire clamping assembly including a tire mounting means, said tire mounting means having a first generally U-shaped end portion and a second end portion extending outwardly therefrom, said U-shaped end portion extending in generally abutting relationship with at least two generally opposing side walls of said elongated central sleeve means so as to prevent the rotation of said elongated central sleeve means within said U-shaped end portion, a clamping plate moveably disposed along said second end portion of said tire mounting means for selectively engaging a tire disposed about said tire mounting means, means for urging said clamping plate means toward said first end portion of said tire mounting means, said means for urging said clamping plate means being adjustable to move said clamping plate means against a tire carried by said tire mounting means while simultaneously urging said first generally U-shaped end portion of said tire mounting means into a pressured engagement with said elongated central sleeve means to thereby prevent any rotational manipulation of said elongated central sleeve means.

2. The spare tire carrier apparatus of claim 1 in which said upper end portion of said vehicle, body engaging assembly includes a threaded rod portion having a rail engaging member disposed at one end thereof, said threaded rod portion being vertically adjustably received within said upper portion of said elongated central sleeve means so as to be adjustably extendable therefrom.

3. The spare tire carrier apparatus of claim 2 in which said lower end portion of said vehicle body engaging assembly includes a rod means having first and second ends, said first end of said rod means being freely movably received within said lower portion of said central sleeve means, said second end of said rod means being angularly disposed with respect to said first end so as to extend toward the adjacent side wall of the truck, and a base means carried by said second end of said rod means.

4. The spare tire carrier apparatus of claim 3 in which said base means of said second end of said rod means includes channel means for simultaneously abutting the floor and side wall of a pickup truck.

5. The spare tire carrier apparatus of claim 4 in which said second end portion of said tire mounting means is threaded along at least a portion of its length.

6. The spare tire carrier apparatus of claim 1 in which said central elongated sleeve is generally rectilinear in cross section and said first end portion of said tire mounting means is generally squared so as to be in generally abutting relationship with at least three of said generally planar side walls of said elongated central sleeve means.

7. The spare tire carrier apparatus of claim 6 in which said clamping means includes a pin means which extends generally parallel to said second end portion of said tire mounting means for engaging a locknut hole in the spare tire and a central aperture through said clamping means to permit said clamping means to be slidingly received over said second end portion of the tire mounting means.

8. The spare tire carrier apparatus of claim 7 in which said means for urging said clamping means includes a nut means threadingly adjustably carried by said second end portion of said tire mounting means and handle means extending outwardly from said nut means so as to obtain leverage in turning said nut means.

9. The spare tire carrier apparatus of claim 8 including locking means for securing said clamping means to said second end portion of said tire mounting means.

10. The spare tire carrier apparatus of claim 9 in which said locking means includes a chain element fixedly secured to said clamping member and a lock connecting said chain means with said handle means.

11. The spare tire carrier apparatus of claim 8 including locking means for securing said clamping means to said nut means.

12. A spare tire carrier apparatus for pickup trucks in which trucks have a load bed floor and side walls with an upper rail, said spare tire apparatus comprising a vehicle body engaging assembly and a spare tire clamping assembly, said vehicle body engaging assembly having upper and lower end portions and a generally hollow elongated central sleeve means having upper and lower portions, said generally hollow elongated central sleeve means having generally planar side walls, one of said upper and lower end portions of said vehicle body engaging assembly being vertically adjustable relative to said elongated central sleeve means by manual rotation of said elongated central sleeve means, means carried by said upper end portion of said vehicle body engaging assembly to engage the side rail of the pickup truck, said lower end portion of said vehicle body engaging assembly having a first portion which is received within said lower portion of said elongated central sleeve means and a second portion which extends in angular relationship to said first portion, means carried by said second portion of said lower end portion of said vehicle body engaging assembly for engaging the load bed floor of the pickup truck, means secured to said first portion of said lower end portion for supporting said elongated central sleeve means, said spare tire clamping assembly including an elongated J-bolt having a generally hooked shaped head portion and a generally straight threaded end portion, said head portion of said J-bolt engaging said generally planar side walls of said elongated central sleeve means in such a manner as to prevent the rotational movement of said elongated central sleeve means within said head portion, a clamping plate movably disposed along said generally straight threaded end portion of said J-bolt for selectively engaging a tire disposed about said threaded end portion, nut means threadingly carried by said threaded end portion of said J-bolt in order to urge said clamping plate against a tire carried by said tire clamping assembly while simultaneously urging said head portion of said J-bolt into a pressured engagement with said generally planar side walls of said elongated central sleeve means, and means for locking said nut means from axial movement along said threaded end portion of said J-bolt.

* * * * *